United States Patent [19]
Mori et al.

[11] Patent Number: 4,487,563
[45] Date of Patent: Dec. 11, 1984

[54] OIL-FREE ROTARY DISPLACEMENT COMPRESSOR

[75] Inventors: Hidetomo Mori, Ibaraki; Akira Suzuki, Atsugi; Riichi Uchida; Shigeru Sasaki, both of Ibaraki, all of Japan

[73] Assignee: Hitachi, Ltd., Tokyo, Japan

[21] Appl. No.: 516,912

[22] Filed: Jul. 25, 1983

[30] Foreign Application Priority Data

Sep. 17, 1982 [JP] Japan ................. 57-160976

[51] Int. Cl.³ ............................ F01C 1/16; F16J 9/04
[52] U.S. Cl. .................................... 418/201; 418/104
[58] Field of Search ................. 418/201–204, 418/113, 122, 123, 140, 142, 143, 104; 277/203, 204, 234; 308/187.1, 187.2

[56] References Cited

U.S. PATENT DOCUMENTS

| 3,535,057 | 10/1970 | Kodra ................. 418/201 |
| 4,273,343 | 6/1981 | Visser ................. 277/203 |
| 4,406,465 | 9/1983 | Rockwood ............ 277/204 |

FOREIGN PATENT DOCUMENTS 64172 5/1980 Japan .
39361 4/1981 Japan .
164281 12/1981 Japan .

Primary Examiner—Leonard E. Smith
Assistant Examiner—Jane E. Obee
Attorney, Agent, or Firm—Antonelli, Terry & Wands

[57] ABSTRACT

An oil-free rotary displacement compressor including a casing having a main casing defining a compression space, a pair of rotors housed in the compression space and each having a screw thread portion and shaft portions, radial bearings and thrust bearings for journalling the rotors, shaft sealing means for sealing the shaft portions to avoid gas leaks from the compression space to outside and entry of oil into the compression space from the bearings. Floating type screw seal rings, each formed on the inner surface with a spiral screw thread and a root of thread, are each fitted over one of the suction-side shaft portions and supported by the casing in such a manner as to be movable in both the radial and the axial directions with respect to the casing. Stationary type screw seal rings, each formed with a spiral screw thread and a root of thread are each fitted over one of the discharge-side shaft portions and supported by the casing in such a manner as to be movable only in the axial direction with respect to the casing.

21 Claims, 6 Drawing Figures

OIL-FREE ROTARY DISPLACEMENT COMPRESSOR

BACKGROUND OF THE INVENTION (1) Field of the Invention

This invention relates to dry type rotary displacement compressors wherein no oils for lubrication, cooling and sealing are supplied to a compression space for producing oil-free compressed gases, and more particularly it is concerned with a screw compressor of the type described.

(2) Description of the Prior Art

In dry type (oil-free type) rotary displacement compressors, no oil is supplied to a compression space for housing rotors therein, but there is the risk of the oil for lubricating the bearings for journalling the rotors entering the compression space. The oil enters the compression space through clearances between the shafts connected to the rotors and the wall of the casing enclosing the shafts. Thus it has hitherto been usual practice to provide oil shield means between the shafts and the compression space. The oil shield means are known from Japanese patent application No. 134,532/78 (Japanese patent Laid-Open No. 55-64172), Japanese patent application No. 112,900/79 (Japanese patent Laid-Open No. 56-39361) and Japanese patent application No. 67,825/80 (Japanese patent Laid-Open No. 56-164281), for example.

The prior art referred to hereinabove is directed to concrete constructions of the oil shield means, and no proposals have been made to solve the problem with regard to the position in which the oil shield means is located and the construction of the oil shield means particularly suitable for the selected position that would provide a good combination of position and construction.

SUMMARY OF THE INVENTION (1) Objects of the Invention

An object of this invention is to provide a rotary displacement compressor capable of avoiding entry of lubricating oil for the bearings into the compression space, to produce oil-free gas under high pressure.

Another object is to provide a rotary displacement compressor wherein the position in which the oil shield means is located and the construction of the oil shield means provide a suitable combination of position and construction for producing oil-free gas.

Still another object is to provide a single stage, oil-free screw compressor provided with oil shield means suitable for use with a compressor of the pressure ratio (the ratio of the discharge pressure to the suction pressure) of 5-8.

A further object is to provide an oil-free screw compressor wherein component parts are small in number and assembling of the parts is facilitated.

(2) Statement of the Invention

To accomplish the aforesaid objects, the invention provides a feature that floating seal ring means is provided to a position between a suction-side bearing and a compression space and stationary seal ring means is provided to a position between a discharge-side bearing and the compression space.

The floating seal ring means which is supported for movement in both the radial and the axial directions with respect to the casing is capable of following the movements of the rotary shaft, particularly in the radial direction. This enables a radial clearance between the seal ring and the shaft to be reduced, thereby improving the sealing ability of the seal ring means. The pressure differential between a box for the suction-side bearing and the compression space is small and sometimes the compression space may become lower in pressure than the suction-side bearing box close thereto, resulting in the oil in the suction-side bearing box tending to be drawn to the compression space. This trouble can be effectively avoided by using the floating seal ring means.

The stationary seal ring means which is affixed to the casing through sealing materials does not essentially move in both the radial and the axial directions, so that it is necessary to provide a slightly greater radial clearance between the seal ring and the shaft than would be the case if the seal ring were a floating seal ring. Thus the stationary seal ring means is lower in sealing ability than the floating seal ring means. However, since a box for housing the discharge side bearing is usually lower in pressure than the compression space adjacent thereto, the pressure differential suppresses entry of oil from the discharge-side bearing box into the compression space. Thus the entry of oil from the discharge side bearing into the compression space can be avoided.

DESCRIPTION OF THE PREFERRED EMBODIMENT

Figure 1:
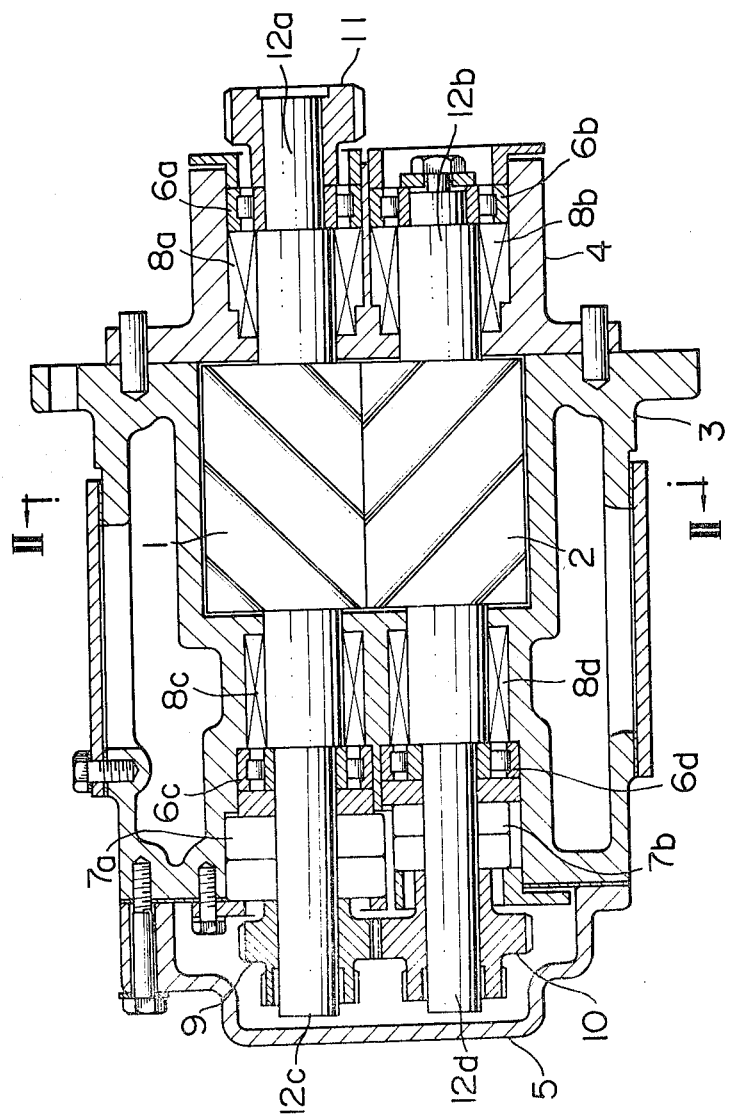
FIG. 1 is a transverse sectional view of the oil-free screw compressor comprising one embodiment of the invention.
Figure 2:
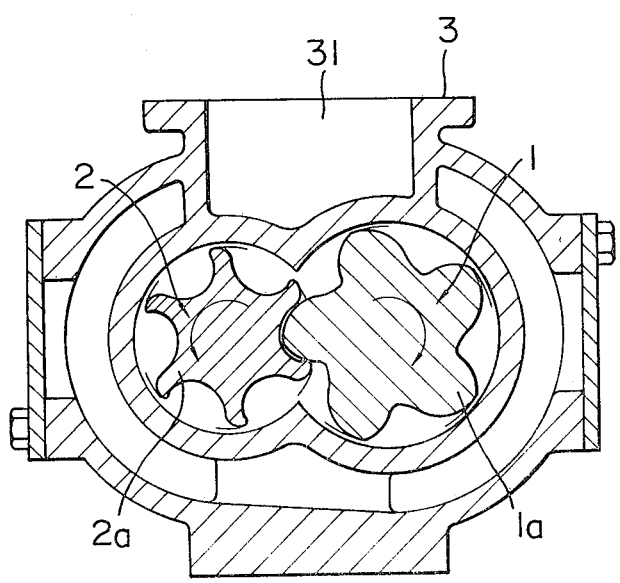
FIG. 2 is a sectional view taken along the line II—II in FIG. 1.

The accompanying drawings show one embodiment of the invention as incorporated in a single stage, oil-free screw compressor.

A male rotor 1 including a gear thread 1a and shaft portions 12a and 12c and a female rotor 2 including a gear thread 2a and shaft portions 12b and 12d are located in a compression space defined by a casing while being maintained in meshing engagement with each other.

The casing includes a main casing 3, a suction-side casing 4 connected to the main casing 3 through bolts and an end cover 5 also connected to the main casing 3 through bolts, the main casing 3 defining the compression space in the form of two cylindrical bores intersecting each other.

The shaft portions 12a and 12c of the male rotor 1 and the shaft portions 12b and 12d of the female rotor 2 penetrate the casing, and shaft sealing means 8a, 8b, 8c and 8d are mounted on the shaft portions 12a, 12b, 12c and 12d respectively in positions where they penetrate the casing. The shaft sealing means 8a, 8b, 8c and 8d are located close to the rotors for sealing the shafts to prevent compressed gas (compressed air) from leaking to outside from the compression space and keep oil for lubricating bearings from entering the compression space from the bearings.

The two rotors 1 and 2 are supported by the casing through radial bearings 6a, 6b, 6c and 6d for bearing radial loads and by thrust bearings 7a, 7b, 7c and 7d for bearing thrust loads.

A pair of timing gears 9 and 10 meshing with each other are mounted on the discharge-side shaft portions of the rotors 1 and 2, to enable the rotors 1 and 2 to rotate while being out of contact with each other. A pinion 11 is mounted on the end of the suction-side shaft portion 12a of the male rotor 1 and driven by a pull gear, not shown. When motive force is transmitted from a drive source to the pinion 11, the male and the female rotors 1 and 2 forming a pair are rotated in synchronism with each other through the timing gears 9 and 10 while being spaced apart from each other by a small clearance. As a result, gas (air) is drawn by suction through a suction passageway 31 and a suction port, not shown, into a compression chamber defined between the screw threads 1a and 2a of the rotors 1 and 2. As the rotors 1 and 2 rotate, communication between the compression chamber and the suction port is shut off and the compression chamber gradually becomes smaller in volume, so that the gas (air) in the compression chamber is compressed and discharged through a discharge port, not shown, to be used for various purposes.

Figure 3:
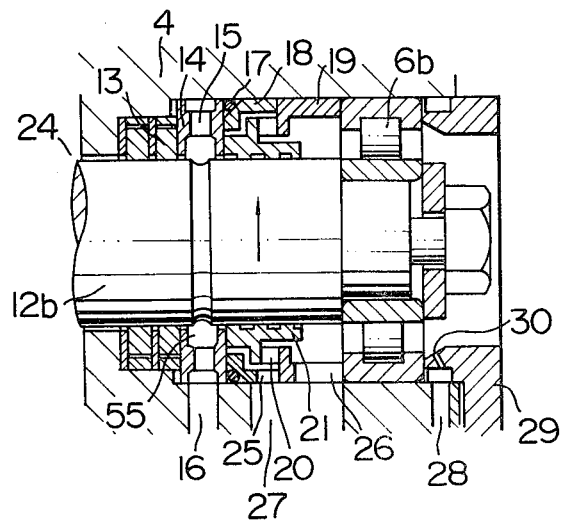
FIG. 3 is a view, on an enlarged scale, of the suction-side shaft portion shown in FIG. 1.

FIG. 3 shows in detail the shaft portion 12b of the female rotor 2 on its suction side. The rotors 1 and 2 are of substantially the same construction, so that description of the shaft portion 12a of the male rotor 1 on its suction side shall be omitted. The numeral 13 designates sealing means of a non-contact type for sealing the shaft portions against gas, the non-contact type sealing means comprising rings formed of carbon or resin, such as tetrafluoroethylene, and arranged in side-by-side relation. The radial roller bearing 6b receives a supply of lubricant delivered in jets through an oil feed duct 28 and a port 30 formed in a bearing support 29. After passing the bearing 6b, a major portion of the lubricant is discharged through an oil discharge duct 26. A suction end 24 of the compression space in which the rotors 1 and 2 are located is at a negative pressure at all times and the negative pressure is enhanced during a no-load operation. Thus air is drawn at all times to a space 55 by suction through an atmosphere communicating duct 16 and a plurality of ports 15 formed in a lantern ring 14, so that the space 55 defined between the lantern ring 14 and the shaft portion 12b is at a negative pressure at all times and the negative pressure becomes enhanced during a no-load operation. Thus it is necessary to use oil shield means of high sealing ability to prevent the oil discharged from the bearing 6b from being drawn by suction into the compression space. To this end, there is used screw seal means capable of performing a satisfactory sealing function through a pumping action when the shafts are rotated. The screw seal has a sealing ability which is substantially in inverse proportion to the radial clearance between the shaft and the screw seal, so that a screw seal ring 21 of a floating type is used to minimize the radial clearance.

Figure 4:
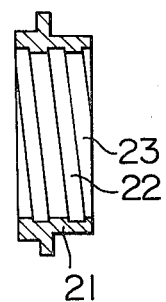
FIG. 4 is a sectional view of the floating screw seal ring shown in FIG. 3.

The screw seal ring 21 is formed on its inner surface with a spiral screw thread 23 and a root of thread 22 as shown in FIG. 4. As the shaft portion 12b rotates in the direction of an arrow in FIG. 3, the gas (air) in the root of thread 22 is pulled due to its viscosity and flows from the space 55 in the direction of the bearing 6b while performing a pumping action to discharge the oil in the direction of the bearing. The screw seal ring 21 is pressed by a corrugated spring or coil spring 20 against the lantern ring 14 into end-to-end contact with each other. Since the seal ring 21 is radially movable, the seal ring 21 can be prevented from coming into contact with the shaft portion 12b if the clearance between the seal ring 21 and the shaft portion 12b is slightly larger than the radial clearance of the bearing 6b, thereby enabling the seal ring 21 to have a high sealing ability. A ring 18 is formed with an oil discharge port 25, and an O-ring 17 is mounted between the lantern ring 14 and the ring 18 to prevent the oil from leaking to an outer periphery of the lantern ring 14.

Figure 5:
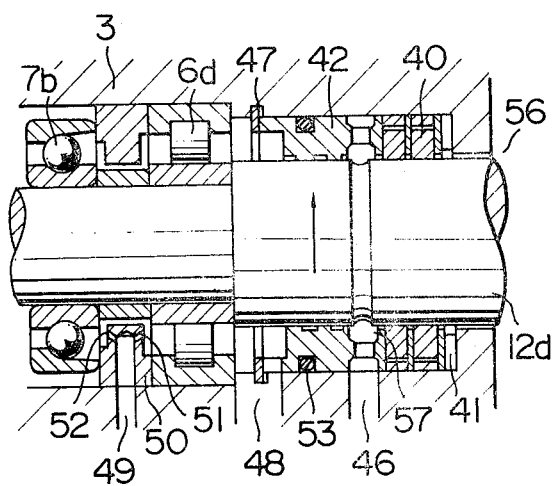
FIG. 5 is a view, on an enlarged scale, of the discharge-side shaft portion shown in FIG. 1.
Figure 6:
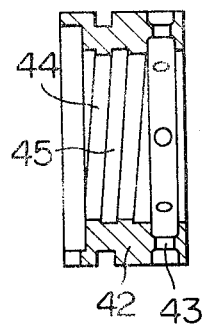
FIG. 6 is a sectional view of the stationary screw seal ring shown in FIG. 5.

FIG. 5 shows in detail the shaft portion 12d of the female rotor 2 on its discharge side. The rotors 1 and 2 are of substantially the same construction, so that description of the shaft portion 12c of the male rotor 1 on its discharge side shall be omitted. The numeral 40 designates sealing means of the noncontact type for sealing the shaft portions against gas, this sealing means being of the same construction as the means 13 described hereinabove. The radial roller bearing 6d and the thrust roller bearing 7b receive a supply of lubricant delivered in jets through an oil feed duct 49 and small ports 51 and 52 formed in an oil feed ring 50. After passing the bearing 6d, a major portion of the lubricant is discharged through an oil discharge duct 48. A discharge end 56 of the compression space is at a positive pressure (higher than the atmospheric pressure) at all times, so that a portion of the gas (air) is released to the atmosphere through the gas sealing means 40 from an atmosphere communicating duct 46. Thus the pressure in a space 57 is positive at all times, and there is no risk of the oil being drawn by suction into the compression space. However, it is necessary to provide means for preventing the oil from leaking to outside through the atmosphere communicating duct 46 after passing the bearings 6d. The seal ring means for the shaft portions on the discharge side need not have a high sealing ability, so that there is used a stationary type screw seal ring 42 of a relatively large radial clearance. As shown in FIG. 6, the screw seal ring 42 is formed on its inner surface with a spiral screw thread 44 and a root of thread 45. As the shaft portion 12d rotates in the direction of an arrow shown in FIG. 5, the seal ring 42 performs a sealing function by its pumping action. An O-ring 53 is mounted on an outer periphery of the screw seal ring 42 to prevent the oil from leaking to outside through the clearance between the casing 3 and the outer peripheral surface of the seal ring 42. The screw seal ring 42 is formed with a plurality of ports 43 for releasing gas (air) to the atmosphere. The shaft sealing means 40 and the screw seal ring 42 are pressed against a snap ring 47 by a corrugated spring 41.

From the foregoing description, it will be appreciated that the invention is capable of achieving the following effects. According to the invention, there is used floating type screw seal ring means capable of operation with a small radial clearance as oil shield means mounted on the suction side of the compressor which requires sealing means of high sealing ability, and there is also used stationary type screw seal ring means of relatively large radial clearance as oil shield means mounted on the discharge side of the compressor which requires no oil shield means of high sealing ability. Thus the invention enables a combination of oil shield means to be selected in such a manner that each portion of the compressor requiring a seal has assigned thereto suitable oil shield means of a radial clearance that matches the sealing ability necessary for the portion requiring a seal. The use of stationary type screw seal ring means as oil shield means for the discharge side allows the number of parts to be reduced because the lantern ring and the seal ring can be formed into a unitary structure and the number of rings can be reduced. As a result, the stationary type screw seal ring means including the lantern ring has a smaller axial length necessary for mounting than the floating type screw seal ring means, so that the two rotors can have their rigidity increased because the distance between the bearings for supporting them can be reduced. A reduction in the axial distance between the bearings for supporting the rotors is conducive to a rise in the natural frequency of the rotors or a rise in their resonance frequency, ensuring high-speed rotation of the rotors without any danger.

What is claimed is:

1. An oil-free rotary displacement compressor comprising:
   (a) casing means comprising a main casing defining a compression space, and a suction-side casing, connected to an end face of said main casing;
   (b) a pair of rotors housed in said compression space, said pair of rotors each including a screw thread portion and shaft portions extending axially from said screw thread portion;
   (c) radial bearing means comprising bearings each journalling one of said shaft portions of said rotors for rotation, said bearings each being interposed between one of said shaft portions of the rotors and said casing means;
   (d) thrust bearing means interposed between at least the shaft portions located on the discharge side of the rotors and the casing means;
   (e) suction-side seal ring means comprising floating type seal ring means interposed between the shaft portions located on the suction side of the rotors and the casing means, said floating type seal ring means each comprising a screw seal ring fitted over one of the suction-side shaft portions of the rotors and supported by said casing means for movement both in the radial and the axial directions with respect to the casing means, said screw seal ring being formed on its inner surface with a spiral screw thread and a root of thread; and
   (f) discharge-side seal ring means comprising stationary type seal ring means supported between the shaft portions located on the discharge side of the rotors and the casing means, said stationary type seal ring means each comprising a screw seal ring fitted over one of the discharge-side shaft portions of the rotors and supported by said casing means for movement only in the axial direction with respect to the casing means, said screw seal ring being formed on its inner surface with a spiral screw thread and a root of thread.

2. An oil-free rotary displacement compressor as claimed in claim 1, wherein said two seal ring means are each located in a position between the screw thread portion of one of said rotors and said radial bearing means.

3. An oil-free rotary displacement compressor as claimed in claim 2, further comprising means for sealing shafts against gas and lantern ring means both located in a position between the screw thread portion of each of said rotors and said suction-side seal ring means and arranged in the indicated order from the screw thread portion toward the suction-side seal ring means so that the suction-side seal ring is maintained in contact with the lantern ring means.

4. An oil-free rotary displacement compressor as claimed in claim 2, further comprising means for sealing shafts against gas located in a position between the screw thread portion of each of said rotors and the discharge-side seal ring means.

5. An oil-free rotary displacement compressor as claimed in claim 4, wherein said discharge-side seal ring means is formed with gas release ports at an end portion thereof adjacent said means for sealing shafts against gas.

6. An oil-free rotary displacement compressor as claimed in claim 3, wherein said suction-side seal ring means comprises spring means for pressing by its biasing force said suction-side seal ring means against said lantern ring means.

7. An oil-free rotary displacement compressor as claimed in claim 6, wherein said spring means comprises a corrugated spring mounted between a ring located adjacent said radial bearing means and the suction-side screw seal ring.

8. An oil-free screw compressor comprising:
   (a) casing means comprising a main casing, and a suction-side casing connected to said main casing, said main casing defining a compression space in the form of two cylindrical bores intersecting each other;
   (b) a pair of rotors housed in said compression space, said pair of rotors each including a screw thread portion and shaft portions extending axially from said screw thread portion;
   (c) radial bearing means comprising bearings each journalling one of said shaft portions of said rotors for rotation, said bearings each being interposed between one of said shaft portions of the rotors and said casing means;
   (d) thrust bearing means interposed between at least the shaft portions located on the discharge side of the rotors and the casing means;
   (e) a pair of timing gear means fitted over and secured to the pair of rotors for rotating the two rotors in synchronism with each other;
   (f) suction-side seal ring means comprising floating type seal ring means interposed between the shaft portions located on the suction side of the rotors and the casing means, said floating type seal ring means each comprising a screw seal ring fitted over one of the suction-side shaft portions of the rotors and supported by said casing means for movement both in the radial and the axial directions with respect to the casing means, said screw seal ring being formed on its inner surface with a spiral screw thread and a root of thread; and
   (g) discharge-side seal ring means comprising stationary type seal ring means supported between the shaft portions located on the discharge side of the rotors and the casing means, said stationary type seal ring means each comprising a screw seal ring fitted over one of the discharge-side shaft portions of the rotors and supported by said casing means for movement only in the axial direction with respect to the casing means, said screw seal ring being formed on its inner surface with a spiral screw thread and a root of thread.

9. An oil-free screw compressor as claimed in claim 8, wherein said two seal ring means are each located in a position between the screw thread portion of one of said rotors and said radial bearing means.

10. An oil-free screw compressor as claimed in claim 9, further comprising means for sealing shafts against gas and lantern ring means both located in a position between the screw thread of each of said rotors and said suction-side seal ring means and arranged in the indicated order from the screw thread portion toward the suction-side seal ring means so that the suction-side seal ring is maintained in contact with the lantern ring means.

11. An oil-free screw compressor as claimed in claim 9, further comprising means for sealing shafts against gas located in a position between the screw thread portion of one of said rotors and the discharge-side seal ring means.

12. An oil-free screw compressor as claimed in claim 11, wherein said discharge-side seal ring means is formed with gas release ports at an end portion thereof adjacent said means for sealing shafts against gas.

13. An oil-free screw compressor as claimed in claim 10, wherein said suction-side seal ring means comprises spring means for pressing by its biasing force said suction-side seal ring means against said lantern ring means.

14. An oil-free screw compressor as claimed in claim 13, wherein said spring means comprises a corrugated spring mounted between a ring located adjacent said radial bearing means and the suction-side screw seal ring.

15. An oil-free screw compressor comprising casing means defining a compression space, a pair of rotors housed in said compression space, said rotors each including a screw thread portion and shaft portions extending from opposite ends of the screw thread portion, radial bearing means interposed between the shaft portions of said rotors and said casing means for supporting said two rotors for rotation, thrust bearing means for journalling an axial load applied to each of said rotors, and timing gear means secured to the shaft portions of said rotors for causing the two rotors to rotate in synchronism with each other, wherein the improvement comprises:

floating type seal ring means mounted on the suction-side shaft portions of said two rotors; and stationary type seal ring means mounted on the discharge-side shaft portions of said two rotors;

wherein said floating type seal ring means each comprises a screw seal ring fitted over one of the suction-side shaft portions of the rotors and supported by said casing means for movement in both the radial and the axial directions with respect to the casing means, said screw seal ring being formed on its inner surface with a spiral screw thread and a root of thread; and wherein said stationary type seal ring means each comprises a screw seal ring fitted over one of the discharge-side shaft portions and supported by said casing means for movement only in the axial direction with respect to the casing means, said screw seal ring being formed on its inner surface with a spiral screw thread and a root of thread.

16. An oil-free screw compressor as claimed in claim 15, wherein said two seal ring means are each located in a position between the screw thread portion of one of said rotors and said radial bearing means.

17. An oil-free screw compressor as claimed in claim 16, further comprising means for sealing shafts against gas and lantern ring means located in a position between the screw thread portion of each of said rotors and said suction-side seal ring means and arranged in the indicated order from the screw thread portion toward the suction-side seal ring means so that the suction-side seal ring is maintained in contact with the lantern ring means.

18. An oil-free screw compressor as claimed in claim 16, further comprising means for sealing shafts against gas located in a position between the screw thread portion of each of said rotors and the discharge-side seal ring means.

19. An oil-free screw compressor as claimed in claim 18, wherein said discharge-side seal ring means is formed with gas release ports at an end portion thereof adjacent said means for sealing shafts against gas.

20. An oil-free screw compressor as claimed in claim 17, wherein said suction-side seal ring means comprises spring means for pressing by its biasing force said suction-side seal ring means against said lantern ring means.

21. An oil-free screw compressor as claimed in claim 20, wherein said spring means comprises a corrugated spring mounted between a ring located adjacent said radial bearing means and the suction-side screw seal ring.

* * * * *